(12) United States Patent
Couret et al.

(10) Patent No.: US 11,045,873 B2
(45) Date of Patent: Jun. 29, 2021

(54) METHOD FOR MANUFACTURING A PART HAVING A COMPLEX SHAPE BY FLASH SINTERING, AND DEVICE FOR IMPLEMENTING SUCH A METHOD

(75) Inventors: Alain Couret, Saverdun (FR); Jean-Philippe Monchoux, Toulouse (FR); Lise Durand, Toulouse (FR); Houria Jabbar, Toulouse (FR); Thomas Voisin, Toulouse (FR)

(73) Assignee: CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 546 days.

(21) Appl. No.: 14/008,334

(22) PCT Filed: Mar. 29, 2012

(86) PCT No.: PCT/IB2012/051527
§ 371 (c)(1),
(2), (4) Date: Sep. 27, 2013

(87) PCT Pub. No.: WO2012/131625
PCT Pub. Date: Oct. 4, 2012

(65) Prior Publication Data
US 2014/0014639 A1    Jan. 16, 2014

(30) Foreign Application Priority Data

Mar. 31, 2011   (FR) ....................................... 1152761

(51) Int. Cl.
*B22F 3/17*    (2006.01)
*C22C 32/00*    (2006.01)
(Continued)

(52) U.S. Cl.
CPC ................. *B22F 3/17* (2013.01); *B22F 3/14* (2013.01); *B22F 5/04* (2013.01); *C04B 35/645* (2013.01);
(Continued)

(58) Field of Classification Search
CPC ...... B22F 3/14; B22F 3/17; B22F 5/04; B22F 3/105; C22C 29/18
(Continued)

(56) References Cited

U.S. PATENT DOCUMENTS 3,989,438 A * 11/1976 Smith ...................... B22F 3/14
264/332
4,314,961 A * 2/1982 Steinkamp ................ B22F 3/14
264/325
(Continued)

FOREIGN PATENT DOCUMENTS

CN    1685070 A    10/2005
EP    1555332 A1    7/2005
(Continued)

OTHER PUBLICATIONS

Molenat et al., Application of Spark Plasma Sintering to Titanium Aluminide Alloys, Advanced Engineering Materials, 9, pp. 667-669, 2007.
(Continued)

*Primary Examiner* — Justin C Dodson
(74) *Attorney, Agent, or Firm* — Nixon & Vanderhye (57) ABSTRACT

The invention relates to a method for manufacturing a metal, ceramic, or composite part (PF) by flash sintering, which comprises simultaneously applying, inside a die (M), a uniaxial pressure and an electric current to a device containing a powder constituent material, said uniaxial pressure being applied by means of at least two pistons (P1, P2) which slide toward one another inside said die and each of
(Continued)

which has a bearing surface (F1, F2) contacting said material, said bearing surfaces engaging so as to define the shape of the part to be manufactured, characterised in that: said part has a complex shape, including at least one first slender portion (V), such as a rod, plate, bevel, or shell, and a second portion (B), such as a base, plinth, or solid part, which is not slender in the slender direction of said first portion, and in that said uniaxial pressure is applied in a direction (z) substantially parallel to the smallest dimension of said first portion of the part, or to one of the two smallest dimensions thereof if said part is a rod. The invention also relates to a device for implementing such a method, and to a turbine blade made of a TiAl intermetallic alloy or a metal/silicide composite sintered by flash sintering.

22 Claims, 6 Drawing Sheets (51) Int. Cl.
F01D 5/28 (2006.01)
C22C 1/04 (2006.01)
C22C 14/00 (2006.01)
B22F 3/14 (2006.01)
C04B 35/645 (2006.01)
B22F 5/04 (2006.01)
C22C 29/18 (2006.01)

(52) U.S. Cl.
CPC ............ *C22C 1/0491* (2013.01); *C22C 14/00* (2013.01); *C22C 29/18* (2013.01); *C22C 32/0078* (2013.01); *F01D 5/28* (2013.01); *B22F 2999/00* (2013.01); *C04B 2235/666* (2013.01); *C04B 2235/94* (2013.01); *F05D 2230/22* (2013.01)

(58) Field of Classification Search
USPC ........ 219/149, 151, 152; 264/402, 404, 430, 264/460; 419/48, 49, 52
See application file for complete search history.

(56) References Cited

U.S. PATENT DOCUMENTS

| 4,325,734 | A | * | 4/1982 | Burrage | H01H 1/0203 419/48 |
| 5,403,373 | A | * | 4/1995 | Kitagawa | B22F 3/22 419/13 |
| 6,048,432 | A | * | 4/2000 | Ecer | B22F 5/003 156/256 |
| 6,384,365 | B1 | * | 5/2002 | Seth | B23K 10/00 219/76.13 |
| 2004/0126266 | A1 | | 7/2004 | Jackson et al. | |
| 2007/0132154 | A1 | * | 6/2007 | Hulbert | B82Y 30/00 264/434 |
| 2010/0139840 | A1 | * | 6/2010 | Allemand | C04B 35/5611 156/89.11 |

FOREIGN PATENT DOCUMENTS

| FR | 2906242 | 3/2008 |
| FR | 2941965 | 8/2010 |
| FR | 2941966 | 8/2010 |
| GB | 2416544 | 2/2006 |
| JP | 2004-137600 | 5/2004 |
| WO | 2010092298 | 8/2010 |
| WO | 2011030815 | 9/2010 |

OTHER PUBLICATIONS

Couret et al., Microstructures and Mechanical Properties of TiAl Alloys Consolidated by Spark Plasma Sintering, Intermetallics, 16, pp. 1134-1141, 2008.
Kato, et al., Trial Manufacturing of TiAl Parts by Injection Molding, Chemical Abstracts Service, 1999.
Bewlay et al., A Review of Very-High-Temperature Nb-Silicide-Based Composites, Metallurgical and Materials Transactions A, 34A, pp. 2043-2052, 2003.
Middlemas et al., Dense, Fine-Grain Mo—Si—B Alloys from Nitride-Based Reactions, JOM, 60, pp. 19-24, 2008.
Bose et al., Engineering Aspects of Creep Deformation of Molybdenum Disilicide, Materials Science and Engineering, 155, pp. 217-225, 1992.
Orru et al., Consolidation/ Synthesis of Materials by Electric Current Activated/ Assisted, Materials Science and Engineering R, 63, pp. 127-287, 2009.

* cited by examiner

METHOD FOR MANUFACTURING A PART HAVING A COMPLEX SHAPE BY FLASH SINTERING, AND DEVICE FOR IMPLEMENTING SUCH A METHOD

BACKGROUND OF THE INVENTION

Field of the Invention

The invention relates to a method of using flash sintering to manufacture a component of complex shape, such as a turbine blade preform to near-finished dimensions. The invention also relates to a device for implementing such a method and to a turbine blade made of sintered TiAl metal-metal or silicide alloy that can be obtained using such a method.

Description of the Related Art

Flash sintering (also known by the acronym "SPS" which stands for "Spark Plasma Sintering") is a sintering technique in which a pulverulent material is compacted by subjecting it to a uniaxial pressure inside a die while at the same time heating it rapidly by applying an electric current. The rapidity of the heating limits the diffusion processes and thus makes it possible to obtain materials that retain their original microstructures. In the case of metal-metal alloys, the benefit lies chiefly in the fact that it limits the increase in the coarseness of the grain size and therefore in that it encourages microstructure refinement.

The article by R. Orru et al. "*Consolidation/synthesis of materials by electric current activated/assisted sintering*", Material Science and Engineering R 63 (2009) 127-287 provides a general overview of this technique. It should be noted that, in this publication, "SPS" refers only to sintering methods in which the electric current is applied in the forms of DC pulses (i.e. pulses where there is no reversal of polarity). In the scope of the present invention, the expression "flash sintering" is to be understood in a broader sense, also including variants in which the current is of the AC type or of the non-pulsed DC type.

Most studies on flash sintering concentrate on the creation of components that are cylindrical, or at most prismatic. Even from an industrial standpoint, this technique is used chiefly to create disks, cylinders or prisms which are then machined into more complex components. This approach is expensive and does not allow efficacious use of certain materials that have advantageous mechanical properties but are difficult to machine.

As an alternative or to complement this, it is known practice to use flash sintering to assemble simpler elements which can be obtained beforehand using flash sintering (refer to document FR 2 906 242 in this regard). The need to resort to several sintering steps leads to an increase in cost. In any event, such an approach is not suitable for all applications because it can be used only for creating assemblies of a small number of components of simple shape (plate, cylinder, prism, etc.).

The "direct" manufacture by flash sintering of components that have more complex shapes has always been considered to be very difficult and has been the subject of a relatively limited amount of academic research and industrial achievement.

The article by E. Olevsky et al. "*Fundamentals of Spark-Plasma Sintering: Applications to Net-Shaping of High Strength Temperature Resistant Components*", Material Science Forums vols. 654-656 (2010) pp. 412-415 discusses the manufacture of components of cylindrical or prism shape of short height and circular cross section, in which the bases alone are structured by the presence of ribs. The authors emphasize that it is uncommon—and difficult—to manufacture components of complex shape using flash sintering. Even in the relatively simple case they are considering, the microstructure of the components produced appears to be substantially non-homogeneous.

The article by Guy Molénat et al. "Application of Spark Plasma Sintering to Titanium Aluminide Alloys", Advanced Engineering Materials 2007, 9, No. 8 looks into the flash sintering of TiAl. Although application to the creation of turbine blades is mentioned, in general terms, as an objective to be achieved, only cylindrical test specimens are actually manufactured.

Document EP 0 535 593 discusses the manufacture by flash sintering of components in the shape of a spiral, with quasicylindrical symmetry. The manufacturing method entails a compacting step prior to the sintering.

Document FR 2 512 146 describes the production, by flash sintering, of thin plates that can be used as brake pads.

Document JP 2004-168632 describes the manufacture of an injector of tapered shape by flash sintering in two stages.

Document JP 1228730 describes the manufacture by flash sintering of a wire-drawing die in the form of a cylindrical roller with one or more tapering recesses.

Document JP 3267552 describes the manufacture of a piston skirt, comprising a step of producing, using flash sintering, a preform of cylindrical overall shape, followed by a step of deep drawing of said preform.

Document WO 2009/004444 describes the production by flash sintering of hollow components, of substantially hemispherical shape, in a biocompatible porous material.

All of the aforementioned cases still fall into the category of relatively simple components, essentially having cylindrical symmetry (EP 0 535 593, JP 2004-168632, JP 1228730, JP 1228730, JP 3267552) or alternatively in the form of thin plates or shells (FR 2 512 1146, WO 2009/004444). Even in the case of these relatively simple shapes, a multi-step method is sometimes needed (EP 0 535 593: prior compaction; JP 2004-168632: flash sintering in two stages; JP 3267552: drawing of a preform). Moreover, the applications targeted by the aforementioned documents are generally not very highly specified from a mechanical standpoint, which means that a certain degree of non-homogeneity of the microstructure of the manufactured components can be permitted (in the case of document WO 2009/004444, a high porosity is even sought after).

The article by Kiyotaka Kato et al. "Trial manufacturing of TiAl parts by injection molding", Mar. 17, 1999 Chemical Abstract Service, Columbus, Ohio, (USA) discusses the manufacture of TiAl components in the form of turbine blades using an injection molding method. The components thus obtained have a relatively non-homogeneous density and non-negligible porosity.

BRIEF SUMMARY OF THE INVENTION

The invention seeks to address the aforementioned disadvantages of the prior art and to allow the direct production by flash sintering of components of complex shape having a very compact and homogeneous microstructure which can therefore be exposed to high mechanical stresses. These components may, for example, be turbine blade preforms to near-finished dimensions, comprising a solid base and a foil in the form of a skew shell. So far as the inventors are aware, flash sintering has never been applied to the manufacture of elements as complex as this. At the very most, documents WO 2010/092298 and FR 2 941 965 disclose the use of a flash sintering technique to apply a thin layer of ceramic coating to turbine blades made of superalloy which have been manufactured by single-crystal fiber drawing followed by surface machining.

Thus, one subject of the invention is a method for manufacturing by flash sintering a component made of metal, ceramic or composite, involving simultaneous application, within a die (M), of a uniaxial pressure and of an electrical current to a pulverulent constituent material, said uniaxial pressure being applied, either directly or via force-transmitting components, by means of at least two pistons (P1, P2) sliding one toward the other inside said die, said pistons and/or said force-transmitting components having bearing surfaces in contact with said constituent material and collaborating with one another to define the shape of the component to be manufactured, characterized in that:

said component has a complex shape, comprising at least a first part that is slender, of the rod, plate, bevel or shell type and a second part of the base, mount or solid component type, that is not slender in the direction in which said first part is slender; and in that said uniaxial pressure is applied in a direction substantially parallel to the smallest dimension of said first part of the component, or of one of its two smallest dimensions in the case of a rod.

What is meant by a "rod" is a component, of constant or variable cross section, that is elongated in one direction and can be inscribed inside a cylinder or prism of length L and of base diameter (or side length) D, with an L/D ratio greater than or equal to 2 and preferably greater than or equal to 4.

What is meant by a "plate" is a volume bounded by two planar surfaces, distant from one another by a thickness e that is small in comparison with the other dimensions $d_1$, $d_2$, with $d_1/e$ and $d_2/e$ ratios greater than or equal to 3 and preferably greater than or equal to 5.

What is meant by a "bevel" is a volume bounded by two near-parallel (which make an angle less than or equal to 15°) planar surfaces, distant from one another by a mean thickness $e_m$ that is small in comparison with the other dimensions $d_1$, $d_2$, with $d_1/e_m$ and $d_2/e_m$ ratios greater than or equal to 3 and preferably greater than or equal to 5.

What is meant by a "shell" is a volume bounded by two near-parallel (angle less than or equal to 15°) non-planar surfaces distant from one another by a mean thickness $e_m$ that is small in comparison with the other dimensions $d_1$, $d_2$, with $d_1/e_n$ and $d_2/e_n$ ratios greater than or equal to 3 and preferably greater than or equal to 5.

What is meant by a "solid component" is a component in which the ratio between the longest and the shortest dimension does not exceed a factor of 2.

What is meant by a "base" is a component that is either solid or alternatively a plate or shell type, the longest dimension or dimensions of which is or are substantially perpendicular to said direction in which said first part is tapered. For preference, said longest dimensions of a base should not exceed half the longest dimension of said first part.

According to some particular embodiments of the method of the invention:

the flash sintering may be performed under floating die conditions, at least in the case of said first part of the component. In order for the material to be under "floating die" conditions, it is necessary that, at every point of said material that is in contact with the lateral bearing surfaces, the material should be able to move during densification parallel to said lateral bearing surfaces, the corresponding movement vector having moreover to have a non-zero component parallel to the direction of application of the pressure. What is meant by "lateral bearing surface" is any surface of a piston, of an insert or of the die that is in contact with the material and substantially parallel to the direction of application of the pressure or, more generally, that makes an angle of less than 45° with said direction.

The method may preferably employ just one flash sintering step.

At least the two said pistons and the component to be manufactured (and, where present, the force-transmitting components) may be surrounded by inserts of D-shaped overall cross section having a first surface espousing the shape of said assembly and a second surface in the shape of a cylindrical arc, espousing the shape of the internal surface of the die.

The method may comprise a prior step of calibrating the temperatures so that a temperature field within an assembly comprising the die, the pistons, the pulverulent constituent material and any inserts can be associated with each value of temperature measured at a point on the die or the pistons by a sensor; and a feedback control of the strength of the electric current so as to control the difference between the temperature measured by said sensor and a reference temperature. Advantageously, said reference temperature may be determined by numerical modeling.

Said pulverulent constituent material may be based on a metal alloy, for example an alloy based on titanium, or alternatively on a metal-metal alloy, for example based on TiAl. What is meant by an "alloy based on TiAl" is an alloy containing at least 40% and preferably at least 45% of Ti, and at least 40% and preferably at least 45% of Al. The percentages refer to the atomic composition. As an alternative, said pulverulent constituent material may contain a metal, such as Nb or Mo, and a silicide of the same (or of a different) metal, together, where applicable, with addition elements or alloying elements such as Ti, Cf, Hf, Al, etc.

Said first part of the component to be manufactured may be a skew shell. What is meant by "skew shell" is a shell (see definition hereinabove), the near-parallel surfaces of which are unregulated, i.e. cannot be generated by the displacement of a straight line.

Said component that is to be manufactured may in particular be a turbine blade preform to near-finished dimensions. What is meant by "to near-finished dimensions" is a preform none of the surface points of which differs from the shape of the finished component by more than 1 mm.

Another subject of the invention is a device for implementing such a method, comprising a die made of an electrically conducting material and at least two pistons, likewise electrically conducting, able to slide one toward the other in a direction referred to as axial inside said die and each having a bearing surface intended to come into contact with a pulverulent material that is to be compacted, said bearing surfaces collaborating to define the shape of the component that is to be manufactured, characterized in that:

said bearing surfaces define a component of complex shape, comprising at least a first part that is slender, of the rod, plate, bevel or shell type and a second part of the base, mount or solid component type, that is not slender in the direction in which said first part is slender; and in that said axial direction is substantially parallel to the smallest dimension of said first part of the component, or of one of its two smallest dimensions in the case of a rod.

As an alternative, the device may comprise a die made of an electrically conducting material, at least two pistons, likewise electrically conducting, able to slide one toward the other in a direction referred to as axial inside said die; and be characterized in that it also comprises force-transmitting components, also electrically conducting, interposed between said pistons and a pulverulent material that is to be compacted, at least said force-transmitting components—and possibly said pistons where appropriate—having bearing surfaces intended to come into contact with said pulverulent material and collaborating to define the shape of the component that is to be manufactured, and in that:

said bearing surfaces define a component of complex shape, comprising a first part that is slender, of the rod, plate, bevel or shell type and a second part of the base, mount or solid component type, that is not slender in the direction in which said first part is slender; and in that said axial direction is substantially parallel to the smallest dimension of said first part of the component, or of one of its two smallest dimensions in the case of a rod.

Said device may also comprise inserts intended to surround at least the two said pistons and the component that is to be manufactured (together with any force-transmitting components where present), each of said inserts having a first surface espousing the shape of said assembly and a second surface in the shape of a cylindrical arc, espousing the shape of the internal surface of the die.

In particular, said bearing surfaces may collaborate to define a turbine blade preform to near-finished dimensions.

Yet another subject of the invention is a turbine blade in metal-metal alloy based on TiAl, sintered using flash sintering, preferably having a porosity with a percentage void space less than or equal to 0.1% and preferably less than or equal to 0.01%, and preferably having no porosity that is detectable (for example, by scanning electron microscopy). This is because metal-metal alloys based on TiAl are materials that are particularly attractive for the manufacture of turbine blades because their density is approximately half (~4 g/cm$^3$) that of the superalloys commonly used for this application (~8 g/cm$^3$). However, these are materials that are difficult and expensive to machine: it would therefore have not been economically viable to fashion a turbine blade made of metal-metal alloys based on TiAl from a conventional preform of cylindrical or prismatic shape, produced by the flash sintering methods of the prior art. Producing turbine blades in metal-metal alloys based on TiAl by powder metallurgy at a competitive price has become possible only via the method of the invention. In addition, the flash sintering method affords improved mechanical properties by refining the microstructures.

Yet another subject of the invention is a turbine blade based on metal-silicide, (for example based on Nb/Nb$_5$Si$_3$ or Mo/MoSi$_2$, possibly containing alloying elements such as Ti, Cr, Hf, Al, etc.) sintered using flash sintering, preferably having a porosity with a percentage void space less than or equal to 0.1% and preferably less than or equal to 0.01%, and preferably having no porosity that is detectable (for example by scanning electron microscopy).

BRIEF DESCRIPTION OF THE DRAWINGS

Other features, details and advantages of the invention will become apparent from reading the description given with reference to the attached drawings given by way of example and which, respectively, depict:

in the case of FIG. 1: a turbine blade preform to near-finished dimensions made of TiAl and produced using the method of the invention;

in the case of FIG. 2A: a view in cross section of a preform identical to that of FIG. 1;

in the case of FIGS. 2B-2E: four pictures obtained by scanning electron microscopy showing the good densification (left-hand figures) and the microstructure (right-hand figures) of various parts of the preform of FIG. 2A;

in the case of FIG. 3: an exploded view of the assembly consisting of the sintering die, the two pistons for applying a uniaxial pressure, the D-shaped peripheral inserts and the sintered component (a turbine blade preform) according to one embodiment of the present invention;

in the case of FIG. 4: a view of the assembly of FIG. 3 under operating conditions;

in the case of FIG. 5A, the manufacture of a turbine blade preform using a method not in accordance with the teachings of the present invention;

in the case of FIGS. 5B and 5C, two pictures obtained by scanning electron microscopy showing the microstructure of various parts of a TiAl preform obtained using the method of FIG. 5A;

in the case of FIG. 6: an exploded view of the assembly consisting of the sintering die, the two pistons that apply uniaxial pressure, the D-shaped peripheral inserts, force-transmitting components and the sintered component (a turbine blade preform) according to an alternative embodiment of the present invention; and in the case of FIG. 7: a picture obtained by scanning electron microscopy showing the microstructure of an Nb/Nb$_5$Si$_3$ preform obtained by a method according to the invention.

DETAILED DESCRIPTION OF THE PREFERRED EMBODIMENTS

Figure 1:
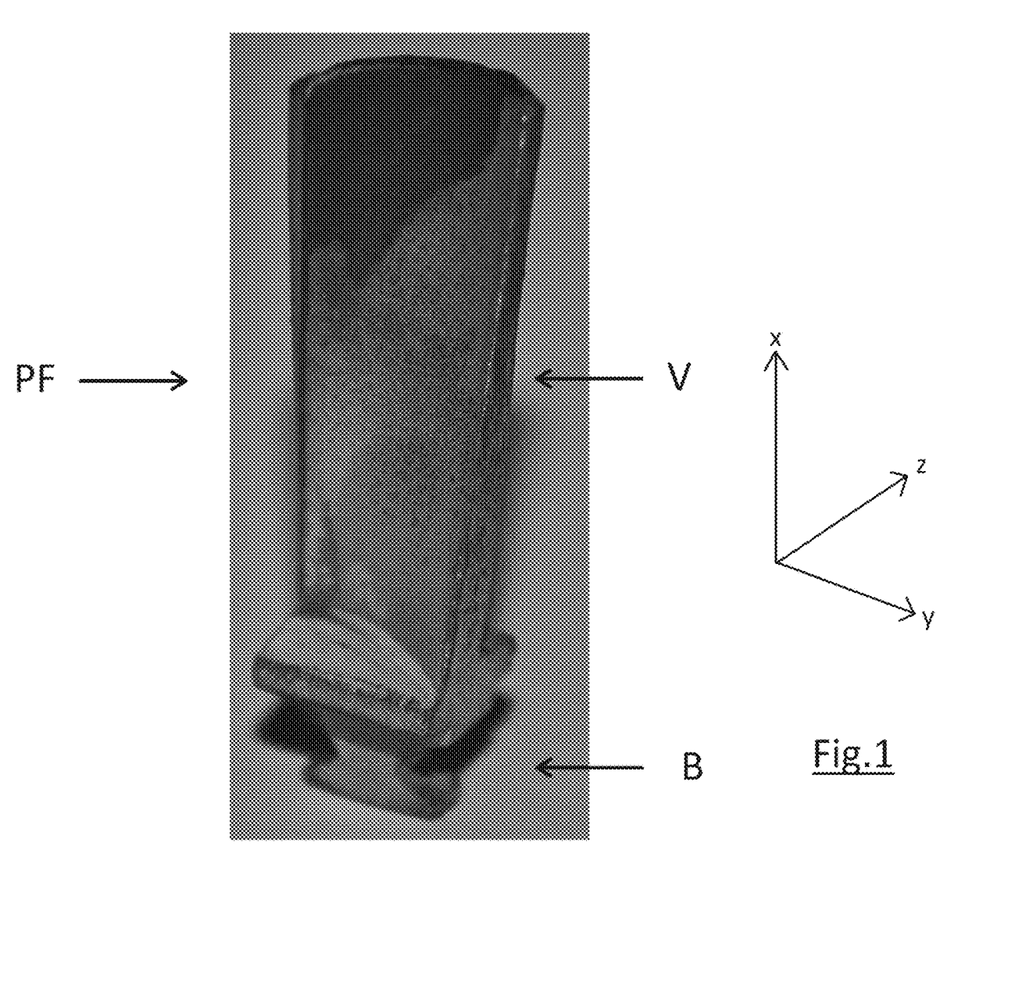
Figure 2A:
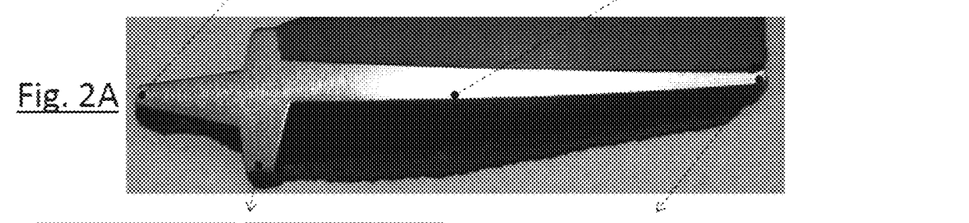
Figure 2B:
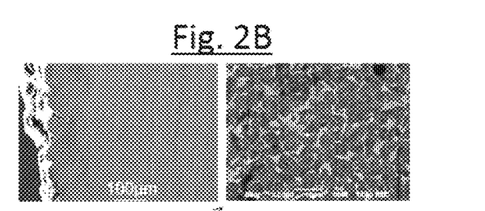
Figure 2C:
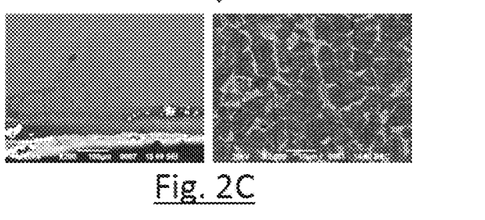
Figure 2D:
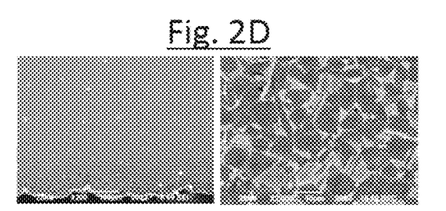
Figure 2E:
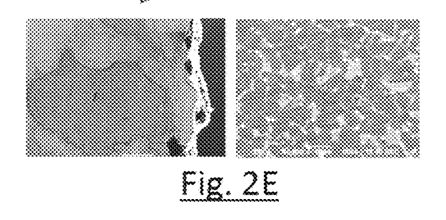

FIG. 1 shows a turbine blade preform PF made of TiAl by a flash sintering method according to the invention. This preform—with a height of 36 mm—is substantially identical to the finished blade and requires just one finishing step, with the removal of a thickness of material of the order of 0.5 mm. It can therefore be qualified as being "to near-finished dimensions". The thickness of material to be removed can be reduced later, down to a value of the order of 0.1 mm corresponding to a layer in which the material is contaminated with graphite. Just like a blade that is ready to use, the preform PF comprises a solid base B of complex shape that cannot be defined from a small number of simple geometric shapes, and a foil V in the form of a skew shell, having pronounced slenderness along an axis "x". It can be immediately noted that the shape of this component is more complex than that of all the objects of which the manufacture by flash sintering has been described in the prior art documents mentioned hereinabove.

Figure 3:
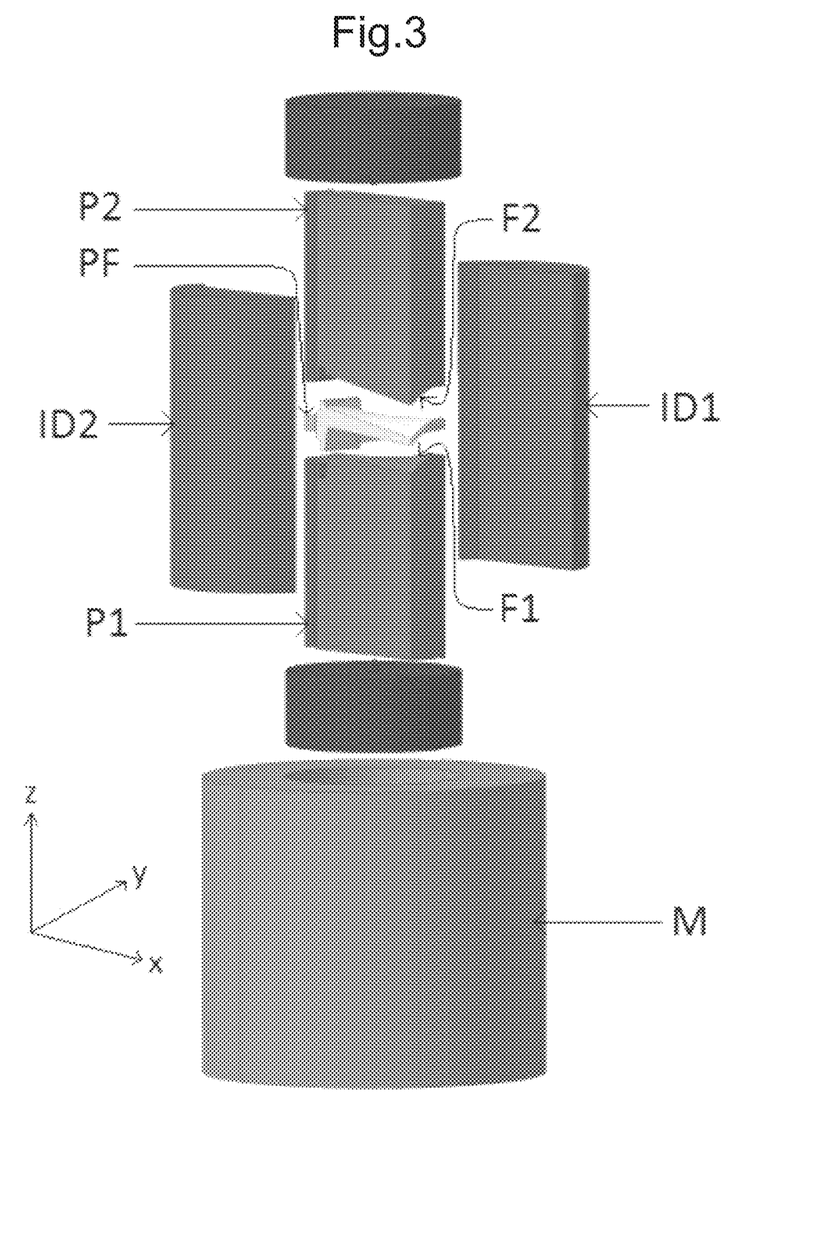
Figure 4:
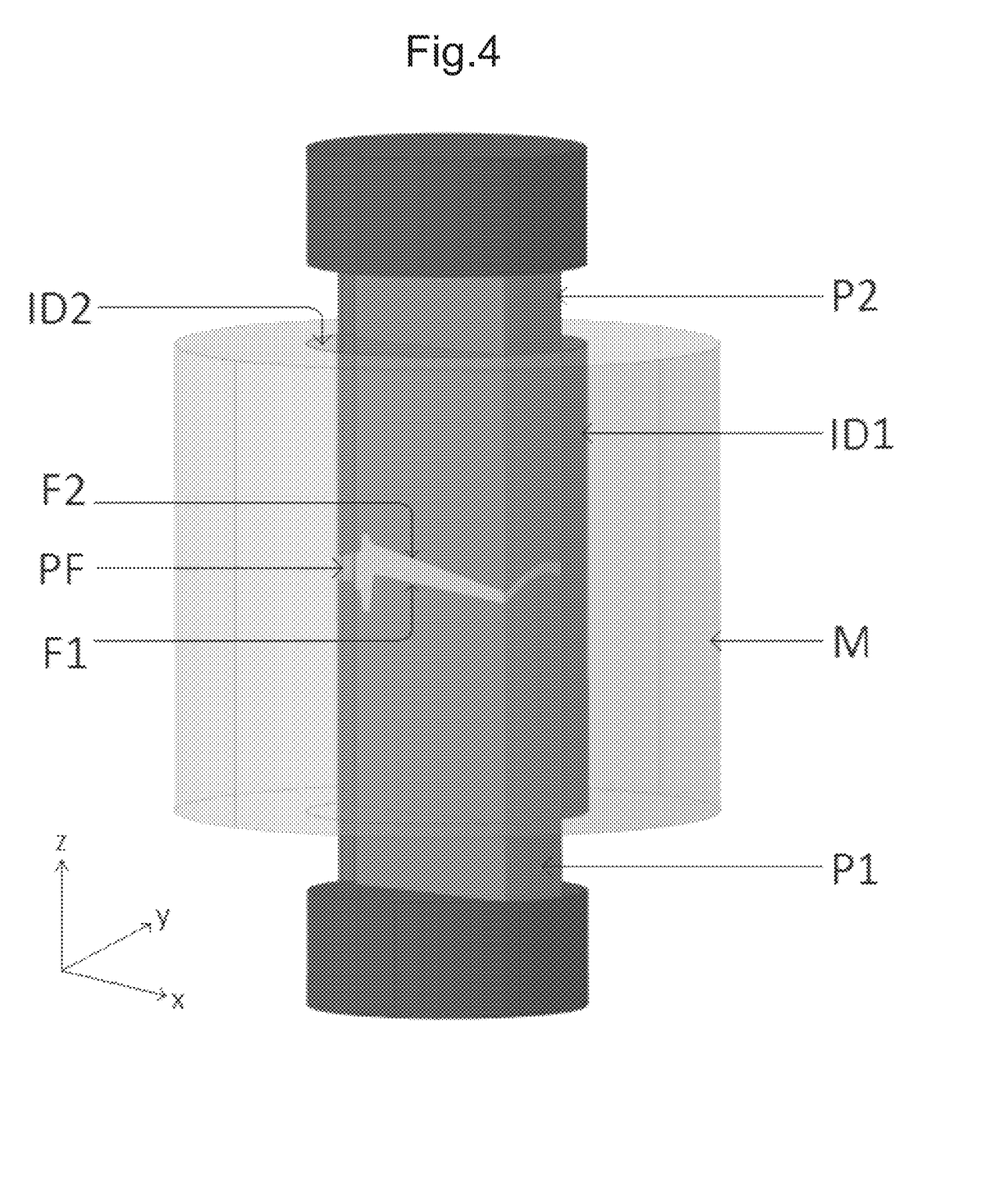

According to the invention, the preform PF may be manufactured by flash sintering by using the device depicted in FIGS. 3 (exploded view) and 4 (view under operating conditions). This device comprises a cylindrical die M made of an electrically conducting material, typically graphite, and two pistons P1, P2, likewise of conducting material (generally the same material as was used for the die), sliding inside the central recess of the die M, in the direction referred to as an axial direction ("z"). These pistons are used to apply a uniaxial pressure, along the axis z, to the pulverulent material that is intended to form the preform PF. This pressure is applied via bearing faces F1, F2 which collaborate to define said preform.

To make the component easier to remove from the mold, its shape incorporates clearance angles, for example of 5°, and/or fillets. Lubrication may be provided by spraying a graphite-based substance onto the various material/graphite and graphite/graphite contact surfaces.

As an alternative, it is possible to use more than two pistons, so as to limit the risks of breakage and/or to allow different pressures to be applied to different points of the components during the manufacturing process.

It will be noted that, in the assembly of FIGS. 3 and 4, the pressure is applied at right angles to the direction in which the foil V is elongate or, and this amounts to the same thing, parallel to the thickness (the smallest dimension) of said foil. As will be clearly apparent from what follows, this orientation is an important feature of the method of the invention. This setup ensures that sintering is performed under floating die conditions, these conditions having been defined hereinabove; that makes it possible to obtain a material that is compact throughout the component despite the irregular shape thereof.

Because of the aforementioned orientation of the preform PF that is to be manufactured, the sections of the pistons P1, P2 are elongated in the direction x. However, the central recess of the die M has to have a cross section that is substantially circular or, in any event, that has no sharp edges, so as to avoid stress concentrations that could cause it to break. The pistons are matched to the recess of the die using inserts ID1, ID2 which are of D-shaped or half-moon-shaped overall cross section with a first surface that espouses the shape of said assembly and a second surface in the shape of a cylindrical arc that espouses the shape of the internal surface of the die (i.e. of its central recess). The inserts ID1, ID2 are preferably made of the same material as the die and the pistons (generally graphite) so as to ensure that the various elements of the assembly undergo the most uniform possible thermal expansion. Of course, the number of inserts may be other than two.

As is generally the case for any flash sintering method, the constituent material of the component that is to be produced (or the precursor thereof) is introduced in powder form into the mold, then a pressure is applied by the pistons in the axial direction z while an electric current is passed through the assembly to achieve rapid heating by the Joule effect. If the constituent material is a conducting material, the electric current passes directly through it and the heat is generated locally; if this material is not conducting, the heat is generated within the mold (which is itself conducting) and transferred to the material by conduction.

The temperature to which the pulverulent material is heated is an important parameter in the method because it has a strong influence over the microstructure of the component thus obtained; it therefore needs to be as uniform as possible over the component as a whole. That can prove critical in the case of a complex component because the irregular shape of this component has a tendency to introduce a non-homogeneous electric current distribution and therefore a non-homogeneous temperature. That being the case, temperature differences may arise between various points of the component, and this is likely to lead to significant impairment of the mechanical properties of the component. In particular, there is a risk of overheating which may go so far as to cause localized melting of the material.

One difficulty is that the temperature of the various parts of the component cannot be measured during the sintering operation; typically, the temperature can be measured in real time only at a few points of the die or of the pistons, using one or more heat sensors such as pyrometers or thermocouples. A calibration is therefore performed: the assembly consisting of the die, the pistons, the inserts and the pulverulent material is designed and then modeled using CAD tools. The Joule effect, which the device is at the heart of, is then simulated using the finite element method, the coupled heat and electricity equations being solved simultaneously throughout the device; for this, refer to the article by G. Molénat, L. Durand, J. Galy and A. Couret "*Temperature Control in Spark Plasma Sintering: an FEM Approach*", Journal of Metallurgy Vol 2010, Article ID 145431. In this way, it is possible to associate a temperature distribution within the device and the material with each temperature value measured by the pyrometer or the thermocouple. This simulation allows the temperature of the material to be evaluated at any point, and this in particular avoids any overheating as the strength of the electric current is feedback controlled to suit the reference temperature.

The preform of FIG. 1 was manufactured using an SPS machine of the "Sumitomo 2080" type, applying a pressure of 100 MPa and bringing the constituent material (TiAl) to a temperature of around 1200° C. (temperature measured by the pyrometer, corresponding to a temperature of around 1260° C. within the heart of the component) using a series of DC pulses (reference temperature ramp 100° C./min up to 1125° C., then 25° C./min up to 1200° C., followed by a two-minute soak—the temperatures being measured by a pyrometer sighting the external surface of the die). As FIGS. 2A-2E show, these operational conditions have made it possible to obtain a material that is very compact and homogeneous, with no porosity visible on a scanning electron microscope. As can be seen in the figures, the microstructure of the compacted TiAl is of the two-phase type throughout the component.

Figure 5A:
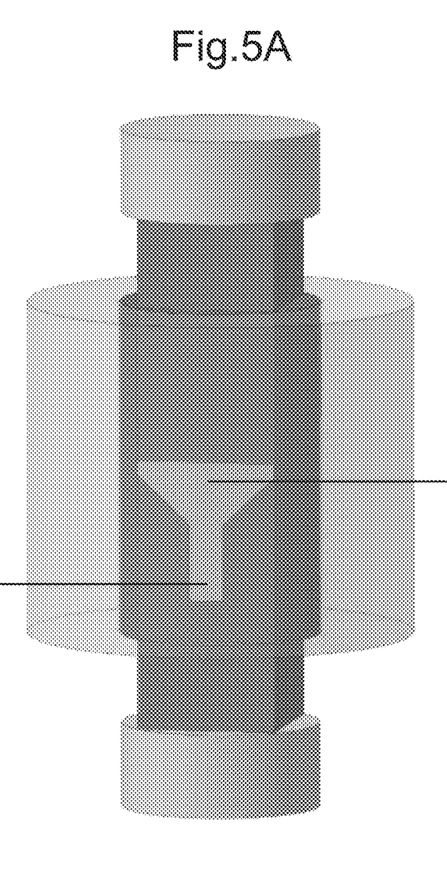
Figure 5B:
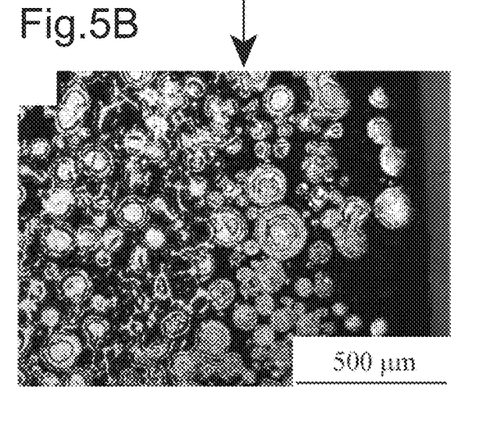
Figure 5C:
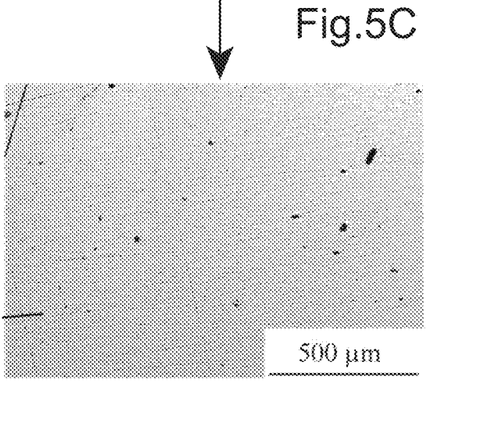

By way of comparative example, FIG. 5A shows a flash sintering configuration in which the pressure is applied parallel to the axis of elongation of the foil. Such a configuration is unable to meet the floating die conditions because, in the part intended to form the tip of the foil, the material cannot move parallel to the lateral bearing surfaces delimiting the main faces of said foil or parallel to the direction of application of the pressure. A view with a scanning electron microscope shows that while the compactness of the base is satisfactory (FIG. 5C), the tip of the foil is highly porous (FIG. 5B). A turbine blade manufactured using this configuration would have mechanical properties that were not good enough to allow it to be used. It will be noted that FIGS. 5A-5C relate to a blade the foil of which has an elongation that is markedly less pronounced than that of the component considered with reference to FIGS. 1 to 4. If producing the component of FIG. 1 were to be attempted using the configuration of FIG. 5A, an even less satisfactory foil compaction state would be obtained, with even more microstructural heterogeneities. This underlines the importance of the orientation of the component within the sintering die.

The method of the invention has been described in detail with reference to the manufacture of a TiAl turbine blade. This is a scenario of particular interest, both from a design standpoint (because of the great geometric complexity of such a component, and because of the very tight requirements in terms of mechanical strength) and from an application standpoint, but is nonlimiting. Thus, the method of the invention applies to the manufacture, by flash sintering, of any kind of component of complex shape, comprising at least a first part that is slender of the rod, plate, bevel or shell type and at least a second part of the base, mount or solid component type that is not slender in the direction in which said first part is slender.

The constituent material of such a component may be all-metal, metal-metal alloy, ceramic or composite that can be compacted by flash sintering.

Another particularly advantageous application of the method of the invention is the production of complex components—notably turbine blades—in metal-silicide composite. These materials combine a silicide, which provides resistance to creep and to oxidation, a metal matrix (made of Nb or Mo), which provides ductility and toughness (it is possible to use a silicide without a metal matrix but the components obtained in that way would be brittle) and possibly addition elements such as Ti, Cr, Hf, Al. Use of such materials in the creation of turbine blades would allow an approximately 150° C. increase in the operating temperature of aeronautical engines. However, although research into such materials began in the 1980s, their shaping has still not yet been mastered.

A blade preform similar to that of FIG. 1 was produced using, by way of constituent material, a 50%-50% by volume mixture of two powders purchased from Alfa Aesar: pure Nb and $Nb_5Si_3$.

Figure 6:
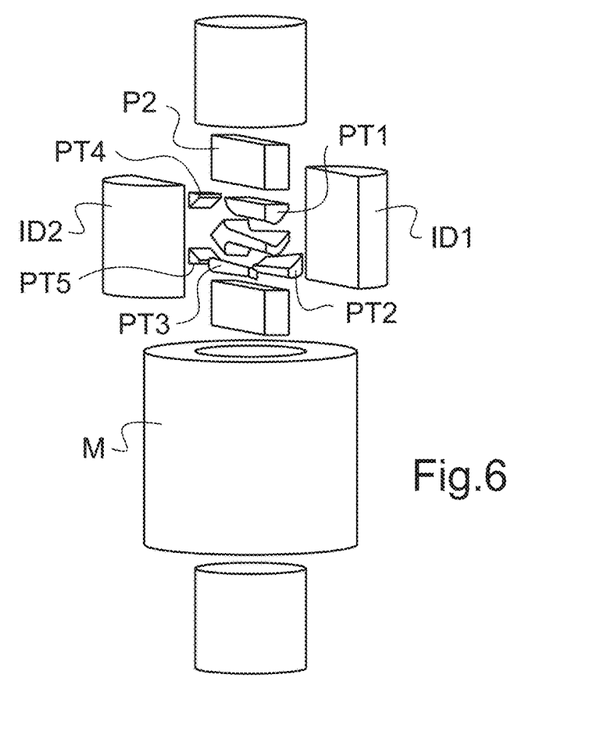
Figure 7:
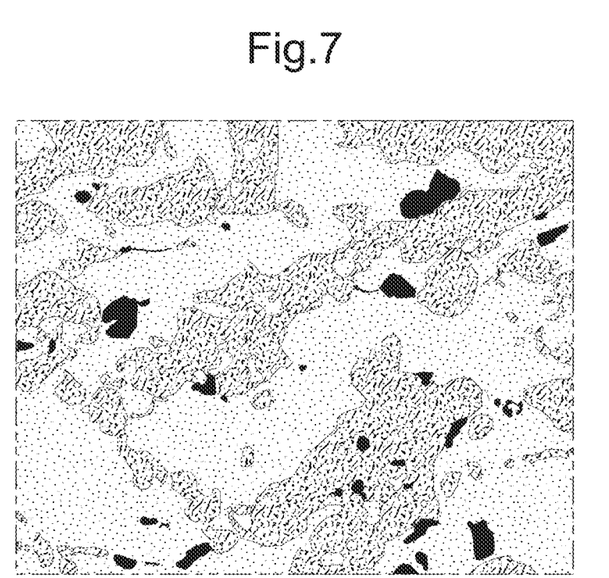

The flash sintering was performed by applying a pressure of 125 MPa for 2 minutes at a core temperature of 1700° C. (reference temperature ramp 100° C./min up to 1525° C. then 25° C./min up to 1600° C. followed by a 2-minute soak, these temperatures being measured by the pyrometer). These conditions are substantially more demanding than those used for sintering TiAl. The method was performed using the apparatus illustrated in FIG. 6. It may be noted from this figure that the matrix covers the pistons more completely in order to improve the flow of the electric current and therefore obtain better distribution of heat within the assembly. Further, force-transmitting components PT1-PT5 are interposed between the pistons and the constituent material. These components carry bearing surfaces that collaborate to define the shape of the component; more specifically, in the example of FIG. 6, the bearing surfaces carried by the force-transmitting components define the foil of the blade and the lower part of its mount, the upper part of the mount being defined by bearing surfaces borne by the pistons. As FIG. 7 shows, the microstructure obtained is two-phase, additionally containing oxides (the darker regions), which have appeared as a result of the high temperatures involved. Micron-scale porosities remain because the composition of the material has not been optimized.

The invention claimed is:

1. A method of manufacturing by flash sintering a component made of metal, ceramic or composite, directly from a powder constituent material, the method comprising:
  at least one flash sintering step including a simultaneous application, within a die made of an electrically conducting material, of a uniaxial pressure and of an electrical current, said uniaxial pressure being applied either directly by at least two pistons having bearing surfaces in contact with said powder constituent material or via electrically conductive force-transmitting components, said electrically conductive force-transmitting components being interposed between said at least two pistons and the powder constituent material, said force-transmitting components or said pistons having bearing surfaces in contact with said powder constituent material, said at least two pistons sliding one toward the other inside said die, bearing surfaces of the at least two pistons or bearing surfaces of the electrically conductive force-transmitting components collaborating with one another and the powder constituent material to define the shape of the component to be manufactured,
  wherein said component to be manufactured comprises a first part that is tapered according to a first direction and having a cross-sectional area that decreases from a second part along the first direction, the second part being a base, a mount, a solid component, or a plate component, and
  said uniaxial pressure is applied in a direction: parallel to a direction defined by a smallest dimension of said first part of the component to be manufactured.

2. The method as claimed in claim 1, wherein only one flash sintering step is employed.

3. The method as claimed in claim 1, wherein the at least two pistons and the component to be manufactured are surrounded by inserts of D-shaped overall cross-section having a first surface having the shape of an assembly comprising the at least two pistons and the powder constituent material and a second surface in the shape of a cylindrical arc, having the shape of an internal surface of the die.

4. The method as claimed in claim 1, further comprising:
  calibrating temperatures so that a temperature field within an assembly comprising the die, the pistons, the powder constituent material and any inserts are associated with each value of temperature measured at a point on the die or the pistons by a temperature sensor; and
  a feedback control of a strength of the electric current to control a difference between the temperature measured by said temperature sensor and a reference temperature.

5. The method as claimed in claim 4, wherein said reference temperature is determined by numerical simulation.

6. The method as claimed in claim 1, wherein said powder constituent material is based on a metal-metal alloy.

7. The method as claimed in claim 6, wherein said metal-metal alloy is an alloy based on titanium.

8. The method as claimed in claim 1, wherein said powder constituent material contains a metal, and a silicide of the metal or of a different metal.

9. The method as claimed in claim 1, wherein said first part of the component to be manufactured is a skew shell.

10. The method as claimed in claim 9, wherein said component to be manufactured is a turbine blade preform to near-finished dimensions.

11. A turbine blade in metal-metal alloy based on TiAl made by the method as claimed in claim 1.

12. The method as claimed in claim 10, wherein the turbine blade is based on metal-silicide.

13. The method as claimed in claim 1, wherein a first dimension of the component to be manufactured according to the first direction is larger than other dimensions of the component to be manufactured that are other than the first dimension.

14. The method as claimed in claim 1, wherein the second part extends in a plane which is perpendicular to the first direction.

15. The method as claimed in claim 1, wherein the second part has a volume bounded by two surfaces distant from one another by a thickness that is smaller in comparison with other dimensions of the second part other than the thickness, a plurality of ratios between the other dimensions of the second part and the thickness being greater than 3.

16. The method as claimed in claim 1, wherein the first part: has a volume bounded by two surfaces distant from one another by a thickness that is smaller in comparison with other dimensions of the first part other than the thickness, a plurality of ratios between the other dimensions of the first part and the thickness being greater than 3, or is elongated in one direction and is configured to be inscribed inside a cylinder or prism of length L and of base diameter or side length D, with an L/D ratio greater than or equal to 2.

17. The method as claimed in claim 1, wherein the first part is one of a rod, a plate, a bevel, and a shell, and
wherein said axial direction is parallel to the smallest dimension of said first part or one of its two smallest dimensions when the first part is the rod.

18. The method as claimed in claim 1, wherein:
the first part is a component of one of:
constant or variable cross-section, that is elongated in one direction and is configured to be inscribed inside a cylinder or prism of length L and of base diameter or side length D, with an L/D ratio greater than or equal to 2, and
volume bounded by two near-parallel planar or non-planar surfaces, distant from one another by a mean thickness $e_m$ that is smaller with respect to other dimensions $d_1$, $d_2$, with $d_1/e_m$ and $d_2/e_m$ ratios greater than or equal to 3, and
the second part is a component in which the ratio between a longest dimension or longest dimensions and a shortest dimension of the second part does not exceed a factor of 2.

19. The method as claimed in claim 1, wherein the first part is tapered according to at least one longest dimension thereof and the smallest dimension of the first part is perpendicular to the first direction.

20. The method as claimed in claim 1, wherein said uniaxial pressure is applied in a direction perpendicular to the first direction.

21. The method as claimed in claim 1, wherein said uniaxial pressure is applied at right angles relative to the first direction and in a direction perpendicular to a direction defined by a longest dimension or longest dimensions of the second part.

22. The method as claimed in claim 1, wherein at least one longest dimension of the second component is perpendicular to the direction in which the first part is tapered.

* * * * *